Figure 1:
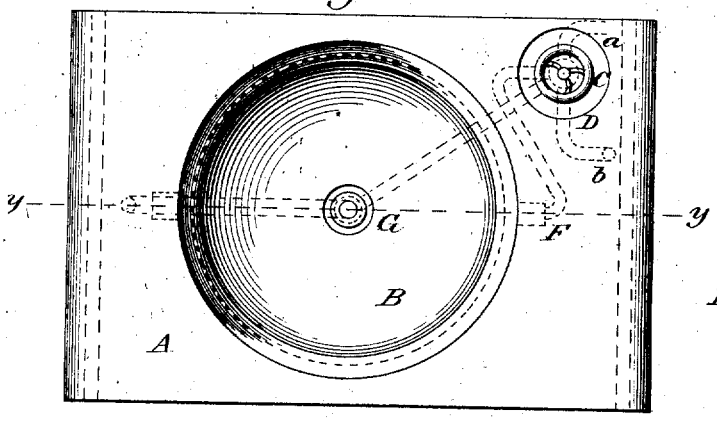

P. ~~N.~~ BURKE.

STATIONARY WASH STAND AND FIXTURE.

No. 10,157. Reissued July 11, 1882.

Witnesses:
P. Filbert Nagle
Alex. Scott

Inventor.
Peter N. Burke
By Joseph R. Edson
attorney

UNITED STATES PATENT OFFICE.

PETER NICHOLAS BURKE, OF BROOKLYN, NEW YORK.

STATIONARY WASH-STAND AND FIXTURE.

SPECIFICATION forming part of Reissued Letters Patent No. 10,157, dated July 11, 1882.

Original No. 252,074, dated January 10, 1882. Application for reissue filed June 9, 1882.

*To all whom it may concern:*

Be it known that I, PETER NICHOLAS BURKE, of Brooklyn, county of Kings, and State of New York, have invented certain new and useful Improvements in Stationary Wash-stands and Fixtures; and I do hereby declare that the following is a full, clear, and exact description and specification of the same, reference being had to the accompanying drawings, making part thereof.

My invention relates to stationary wash-stands, basins, and faucets such as are supplied with water from service-pipes, and from which the waste water is discharged through an opening in the bottom of the basin; and it consists in certain combinations of parts specifically set forth in the claims at the end of this schedule.

In order that persons skilled in the art may understand, make, and use my invention, I will proceed to describe it, referring to the drawings, in which—

Figure 3:
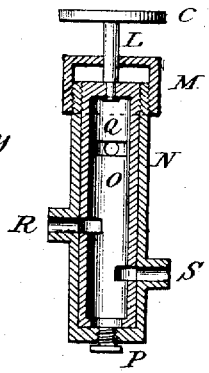
Figure 2:
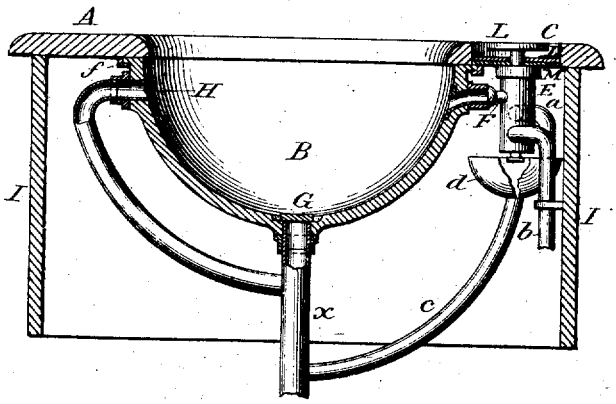
Figure 4:
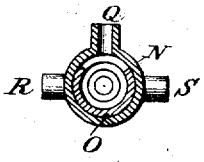
Figure 5:
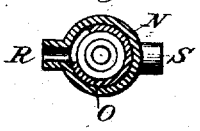
Figure 6:
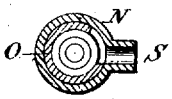
Figure 7:
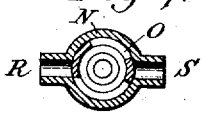
Figure 8:
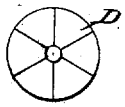

Figure 1 is a top or plan view. Fig. 2 is a vertical central section of Fig. 1 on line Y Y. Fig. 3 is a vertical central section of my supply-valve. Fig. 4 is a cross-section of Fig. 3 through outlet-nozzle Q. Fig. 5 is a cross-section through inlet-nozzle R. Fig. 6 is a cross-section through nozzle S. Fig. 7 is a cross-section through inlet-nozzles R and S when placed on the same plane, the valve-openings in the spud O being arranged accordingly. Fig. 8 represents the index-plate.

A is the supporting-slab, to which both the basin B and the valve and its connections are attached. The lugs *f f* fasten the basin B to the supporting-slab A.

I I are the side supports, which hold up the slab A.

F is the inlet-pipe, which conducts water from the valve E to the inclined opening in basin B. This downward incline directs the inflowing water toward the bottom of the basin and prevents it from spurting across the basin.

G is the discharge-opening in the basin, connected with the discharge-pipe *x*. It is fitted with the usual closing-plug.

H is the overflow-outlet, connected by a pipe to discharge-pipe *x*.

*d* is a cup placed beneath the valve E and its connections to catch any leakage from them and convey it through pipe *c* to the pipe *x*.

E is the supply-valve, fastened beneath slab A, with its stem or key passing up through the slab A, and fitted with a handle, C, to turn the valve-spud by.

Beneath the handle C, and surrounding the stem or key on the top of slab A, in a recess, is an index-plate, D, to indicate in which direction to turn the valve-spud to supply the basin with the kind of water desired and to shut it off entirely.

Q is the outlet-nozzle, to which the supply-pipe F is attached.

R and S are inlet-nozzles connected to two pipes, *a* and *b*, one for hot and the other for cold water. In one form of valve they are placed at different planes and in the other form they are placed on the same plane. By each of these constructions either hot, cold water, or a mixture of both, may be supplied to the basin, as may be needed, or the valve closed.

By placing the valve E below the slab I remove all obstructions from the top of the slab and basin, and no leakage from the valve and its connections comes from the slab. This is an important arrangement.

The stem or key of the valve-spud is screwed into the top of the spud, as shown, which is closed at its top, hollow in its body, and open at its bottom to admit of its being used as an outlet-opening when desirable, in which case the supply-pipe F is attached to the barrel of the valve at its bottom, and the screw-plug P is removed for the purpose and placed in outlet Q, thus closing Q.

The spud O is threaded at its top, and rises slightly up and down when turned in a corresponding thread cut in the upper part of the barrel N. The screw-cap M incloses the top of the spud and barrel, between which and the cap packing is placed.

The valve-handle is placed in a pocket or recess below the surface of the slab to still further relieve the slab from obstructions, my object being to provide a stationary wash-stand basin and supports clear of all projections from its exterior surfaces.

There may be two valves used instead of one, and two inlet-openings into the basin beneath the slab, and they may be placed in a horizontal or any other position, and the handles may be placed in the vertical supports in pockets or otherwise. I do not confine myself to the precise arrangement shown, as many variations may be made.

The operation of my device is as follows: When either hot, cold, or warm water is desired in the basin the valve is turned until the index-plate indicates that it is in the correct position to supply it through pipe F. In passing into the basin the incline of the opening directs it toward the bottom. If the plug is in opening G, the basin will fill until the water reaches the level of the opening H, when it will overflow through H and through the pipe which connects it with pipe *x*, and the basin will fill no further. By removing the plug from G the water will pass out through G into the pipe *x* and away to the sewer. To shut the water off the valve is turned till the index-plate shows that the valve is shut. Should the valve or pipe-joints leak, the cup *d* conveys it through pipe *c* to pipe *x*.

Having now fully described my invention and the manner in which I have embodied it, what I claim as my invention, and desire to secure by Letters Patent, is—

1. A stationary wash-stand composed of a supporting-slab, a basin provided with outlet and overflow openings, and an inlet-opening in the wall of the basin, and a valve constructed as described, to allow the flow of hot or of cold water, or of hot and cold water mixed, said valve being supported by the slab and below the same, and provided with a stem or key projecting through the slab, but flush with the upper surface thereof, all arranged as set forth, so as to leave the top of the stand free from obstructions of any kind.

2. A stationary wash-basin constructed, as described, with outlet and overflow openings, and with an inlet-opening in its wall, inclined as shown, to prevent the water from spurting across the basin, all arranged as shown, so as to leave the inner surface of the basin free from projections or obstructions.

3. A valve for a wash-basin, constructed of a hollow spud and inclosing barrel, two inlet-openings in the barrel for hot and cold water, corresponding inlet opening or openings in the spud, and discharge-openings in the side and bottom of the spud and barrel, all as set forth, so that independent streams of hot and cold water may be admitted into the hollow chamber of the spud, and may be discharged separately or mixed through either or both discharge-openings.

4. The combination, substantially as herein-before set forth, of the discharge-pipe from the basin with the drip-basin and pipe, connected with said discharge-pipe beneath the basin, all constructed and operating substantially in the manner described.

5. The combination, substantially as herein-before set forth, in a stationary wash-stand, of the supports, the basin provided with an inlet-opening beneath the supporting-slab, and the overflow and discharge openings directly and openly connected with each other outside the basin, with a valve for supplying water of the same or of differing temperature to the basin, all constructed and arranged and operating substantially in the manner described.

6. The combination, substantially as herein-before set forth, in a stationary wash-stand, of the basin and its supports, the valve, and its connections, with the handle of the valve placed in a recess of the slab, all constructed and operating substantially in the manner described.

Signed at New York, in the county of New York and State of New York, this 3d day of June, A. D. 1882.

PETER NICHOLAS BURKE.

Witnesses:
H. C. TOWNSEND,
W. N. SAFFORD.